(12) United States Patent
Mitsuishi

(10) Patent No.: US 10,540,305 B2
(45) Date of Patent: Jan. 21, 2020

(54) SEMICONDUCTOR DEVICE

(71) Applicant: Renesas Electronics Corporation, Koutou-ku, Tokyo (JP)

(72) Inventor: Naoki Mitsuishi, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 47 days.

(21) Appl. No.: 15/817,263

(22) Filed: Nov. 19, 2017

(65) Prior Publication Data

US 2018/0181508 A1   Jun. 28, 2018

(30) Foreign Application Priority Data

Dec. 28, 2016   (JP) ................................. 2016-255044

(51) Int. Cl.
*G06F 13/24* (2006.01)
*G06F 9/54* (2006.01)

(52) U.S. Cl.
CPC .............. *G06F 13/24* (2013.01); *G06F 9/542* (2013.01); *Y02D 10/14* (2018.01)

(58) Field of Classification Search
CPC ................................. G06F 13/24; G06F 9/542
See application file for complete search history.

(56) References Cited

U.S. PATENT DOCUMENTS

| | | | |
|---|---|---|---|
| 7,822,899 B2 | 10/2010 | Oyama et al. | |
| 2004/0236875 A1* | 11/2004 | Jinzaki | G06F 9/4812 710/15 |
| 2007/0214374 A1* | 9/2007 | Hempstead | H04W 52/028 713/300 |
| 2008/0221708 A1* | 9/2008 | Oyama | G06F 13/24 700/9 |
| 2009/0316836 A1* | 12/2009 | Wang | G06F 13/426 375/340 |
| 2016/0224486 A1* | 8/2016 | Ibrahim | G06F 13/32 |
| 2017/0116966 A1* | 4/2017 | Brabender | G09G 5/363 |

FOREIGN PATENT DOCUMENTS

JP      2008-250987 A    10/2008

\* cited by examiner

*Primary Examiner* — Zachary K Huson
(74) *Attorney, Agent, or Firm* — Shapiro, Gabor and Rosenberger, PLLC

(57) ABSTRACT

A semiconductor device is provided that can process various events while suppressing complication of logical configuration.

The semiconductor device includes a central processing unit, a plurality of functional blocks, and an event controller. Each functional block includes an interrupt factor detection unit that detects an interrupt factor and outputs an event processing request based on the interrupt factor, an event ID input unit that receives an input of an event ID outputted from the event controller, an event response specification unit that determines whether or not the inputted event ID is an event ID that requires response and, when the inputted event ID is an event ID that requires response, specifies response content corresponding to the inputted event ID, and an event response processing unit that performs event response processing based on the specified response content.

20 Claims, 10 Drawing Sheets

FIG. 3A

| | | |
|---|---|---|
| ACT0<br>(COUNTER START) | EV_ID(0) | PARA(0) |
| ACT1<br>(EVENT COUNT) | EV_ID(1) | PARA(1) |
| ACT2<br>(INPUT CAPTURE) | EV_ID(2) | PARA(2) |

FIG. 3B

| | | | | |
|---|---|---|---|---|
| CTR0<br>(COUNTER START) | EV_ID(0) | REG_SL(0) | WR_EN(0) | WR_DT(0) |
| CTR1<br>(EVENT COUNT) | EV_ID(1) | REG_SL(1) | WR_EN(1) | WR_DT(1) |
| CTR2<br>(INPUT CAPTURE) | EV_ID(2) | REG_SL(2) | WR_EN(2) | WR_DT(2) |

SEMICONDUCTOR DEVICE

CROSS-REFERENCE TO RELATED APPLICATIONS

The disclosure of Japanese Patent Application No. 2016-255044 filed on Dec. 28, 2016 including the specification, drawings and abstract is incorporated herein by reference in its entirety.

BACKGROUND

The present invention relates to a semiconductor device.

A microcomputer is provided in various apparatuses and performs control of each component included in the apparatus. The microcomputer includes, for example, a central processing unit (CPU) at its center, a ROM (read-only memory) for holding a program, a RAM (random access memory) for holding data, and an input/output functional block such as an input/output circuit for performing input/output of data and signals. In a semiconductor device called a single chip microcomputer, the CPU and these functional blocks are formed over the same semiconductor substrate.

When controlling various apparatuses, the microcomputer is required to perform predetermined processing on the input/output functional block responding to, for example, an event such as an interrupt from the input/output functional block. For example, although the CPU can implement arbitrary processing by a combination of commands, when performing interrupt processing, the CPU needs to switch a processing flow by performing exception processing, a stack saving/restoring operation, a restoration command, and the like. In this case, the load of the CPU increases.

On the other hand, Japanese Unexamined Patent Application Publication No. 2008-250987 discloses a data processor and a control system that provide an event response control technique that realizes high-speed data processing and CPU load reduction. As the data processor, separately from an interrupt controller, an event link controller is employed that outputs a start control signal of an operation corresponding to a circuit module responding to a generated event signal.

The circuit module can generate an event signal, and the event link controller generates the start control signal according to a correspondence between the event signal defined by event control information and the start control signal. A linkage between the event signal and the start control signal is defined by event storage information, so that operations of a plurality of circuit modules defined by the linkages are sequentially controlled. The saving/restoring operation by the CPU, which is required in the interrupt processing, is not required, and priority level control on competing interrupt requests is not required.

SUMMARY

In such an event link controller, a correspondence between the event signal to be used and the start control signal is required to be installed in advance as a logic of the microcomputer. However, when the numbers of the event signals and the start control signals increase as the functions of the microcomputer increase, the number of combinations in which the event signal and the start control signal are associated with each other increases.

Further, there is a case in which a plurality of start control signals are generated from one event signal and a case in which one start control signal is generated from a plurality of event signals, so that the number of combinations in which the event signal and the start control signal are associated with each other further increases. Then, a logical configuration of the event link controller becomes very complicated.

Further, an event signal, a start control signal, and a combination of these signals, which a user of the microcomputer wants to use, may not necessarily be prepared. Further, it is considered that these signals are being developed by the user and these signals may be newly recognized. Furthermore, it may be necessary to cope with control of when a plurality of events occur at the same time. As described above, it is difficult to install all the necessary combinations in the microcomputer in advance.

Therefore, an object of the present application is to provide a semiconductor device that can process various events while suppressing complication of logical configuration.

The other purposes and the new feature of the present application will become clear from the description of the present specification and the accompanying drawings.

The following explains briefly the outline of a typical invention among the inventions disclosed in the present application.

A semiconductor device according to a typical embodiment includes a central processing unit, a plurality of functional blocks that output an event processing request based on an interrupt factor, and an event controller that receives an input of the event processing request outputted from each of the functional blocks, arbitrates a plurality of the inputted event processing requests, selects an event processing request to be processed, generates an event ID based on the selected event processing request, and outputs the generated event ID to a plurality of the functional blocks. Each of the functional blocks includes an interrupt factor detection unit that detects an interrupt factor and outputs event processing request based on the interrupt factor, an event ID input unit that receives an input of the event ID outputted from the event controller, an event response specification unit that determines whether or not the inputted event ID is an event ID that requires response and, when the inputted event ID is an event ID that requires response, specifies response content corresponding to the inputted event ID, and an event response processing unit that performs event response processing based on the specified response content.

The following explains briefly the effect acquired by the typical invention among the inventions disclosed in the present application.

According to a representative embodiment of the present invention, it is possible to process various events while suppressing complication of logical configuration.

BRIEF DESCRIPTION OF THE DRAWINGS

FIGS. 3A and 3B are diagrams for explaining an example of a setting method of response content corresponding to an event ID.

DETAILED DESCRIPTION

Hereinafter, embodiments of the present invention will be described with reference to the drawings. In all the drawings for explaining the embodiments, the same symbol is attached to the same component, as a principle, and the repeated explanation thereof is omitted.

First Embodiment

<Configuration of Semiconductor Device>

Figure 1:
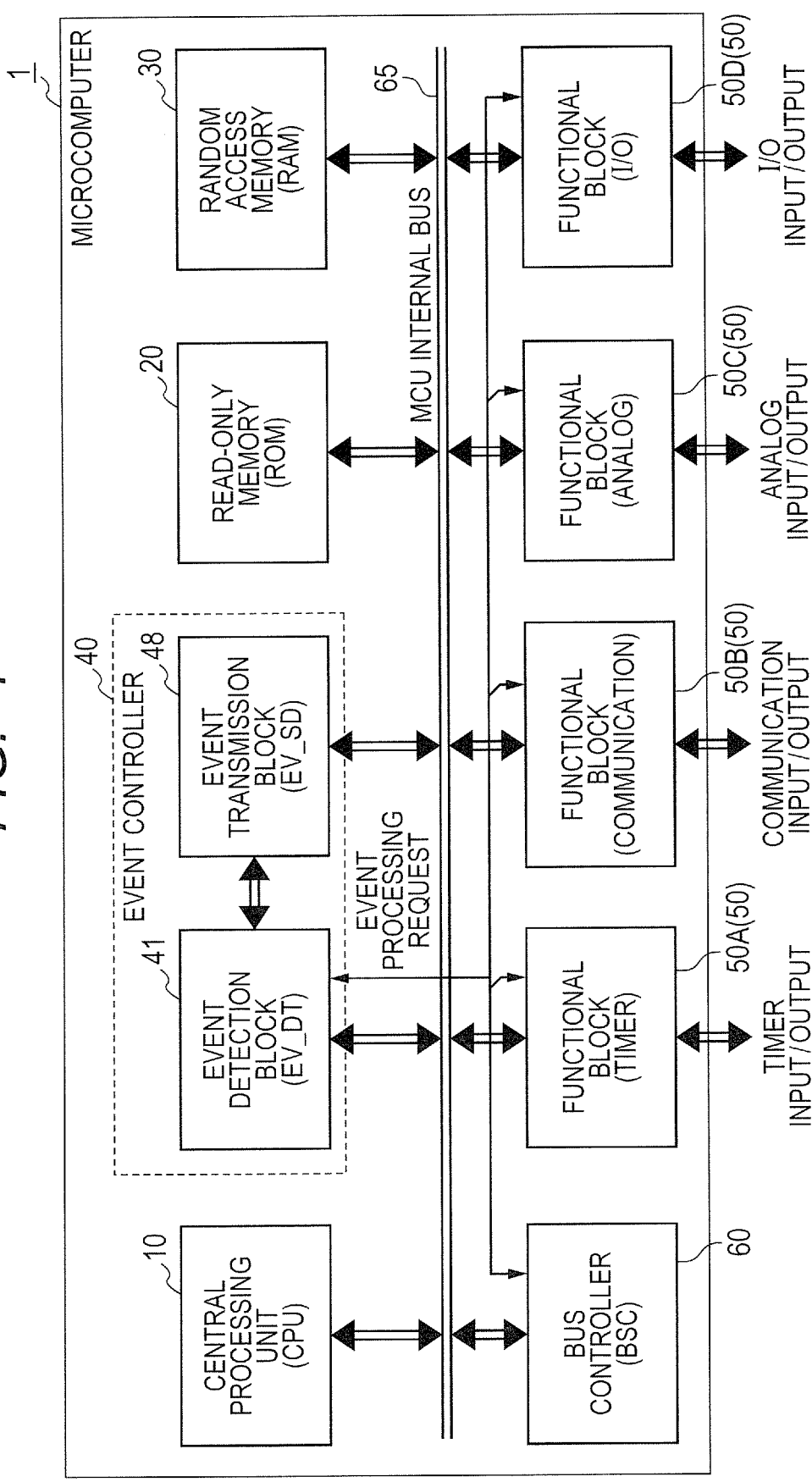
FIG. 1 is a diagram showing an example of a configuration of a microcomputer according to a first embodiment of the present invention.

FIG. 1 is a diagram showing an example of a configuration of a microcomputer according to a first embodiment of the present invention. As shown in FIG. 1, the microcomputer (MCU: Micro Control Unit, semiconductor device) 1 includes, for example, a central processing unit (CPU) 10, a read-only memory (ROM) 20, a random access memory (RAM) 30, an event controller 40, a plurality of functional blocks 50 (for example, 50A, 50B, 50C, and 50D), a bus controller (BSC) 60, an MCU internal bus 65, and the like. As shown in FIG. 1, these components included in the microcomputer 1 are coupled to each other by the MCU internal bus 65 and the like.

For example, the central processing unit 10 reads a command stored in, for example, the read-only memory 20 or the like and executes the read command.

Further, the central processing unit 10 receives, for example, an input of an CPU interrupt request outputted from the event controller 40 and a vector number described later. The central processing unit 10 may receive an input of data and parameters outputted from the event controller 40 along with a CPU interrupt request and a vector number. When the central processing unit 10 receives an input of a CPU interrupt request and a vector number, the central processing unit 10 performs an event response processing (interrupt processing) based on the vector number.

Further, for example, the central processing unit 10 writes and deletes various information to be stored or stored in various registers (described later) provided in the event controller 40 and various registers (described later) provided in each functional block.

The read-only memory 20 is composed of, for example, a nonvolatile memory or the like. The read-only memory 20 stores, for example, commands executed by the central processing unit 10, various setting information of the microcomputer 1, and the like. The read-only memory 20 outputs a command, setting information, and the like, which are stored in the read-only memory 20, based on a request from, for example, the central processing unit 10 or the like. Further, the read-only memory 20 may store a vector table in which, for example, a vector number, an event ID, and a starting address of a service routine are associated with each interrupt factor. Content of the vector table is arbitrarily set by, for example, a user of the microcomputer 1.

The random access memory 30 is composed of, for example, a volatile memory or the like. The random access memory 30 temporarily stores, for example, data generated when the central processing unit 10 executes a command. The random access memory 30 outputs data, which is temporarily stored in the random access memory 30, based on, for example, a request from the central processing unit 10 or the like. Further, the random access memory 30 may store the vector table described above.

For example, the functional blocks 50 are coupled with a peripheral device and performs input/output of various data from/to the peripheral device. As shown in FIG. 1, the microcomputer 1 includes, for example, a functional block (timer) 50A that performs event response processing related to a timer function, a functional block (communication) 50B that performs input/output of serial data from/to the peripheral device, a functional block (analog) 50C that performs input/output of analog data from/to the peripheral device, and a functional block (I/O) 50D that receives an input of an external event processing request outputted from the peripheral device. In this way, the microcomputer 1 includes a plurality of functional blocks 50. The microcomputer 1 may include functional blocks 50 having functions other than those described above (for example, data transfer function).

Figure 2:
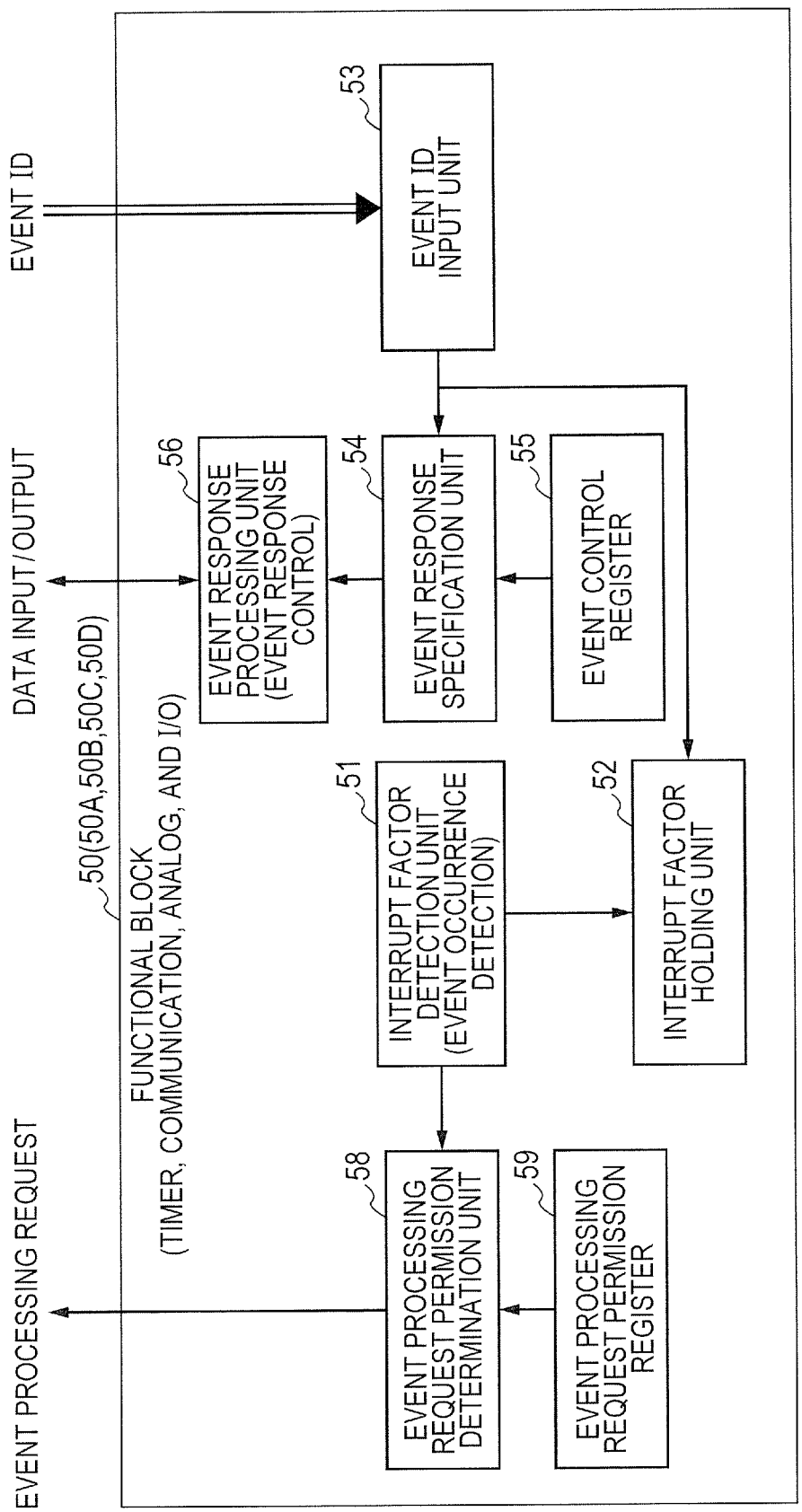
FIG. 2 is a diagram showing an example of a configuration of a functional block according to the first embodiment of the present invention.

FIG. 2 is a diagram showing an example of a configuration of a functional block according to the first embodiment of the present invention. For example, as shown in FIG. 2, each of the functional blocks 50 includes an interrupt factor detection unit 51, an interrupt factor holding unit 52, an event ID input unit 53, an event response specification unit 54, an event control register 55, an event response processing unit 56, an event processing request permission determination unit 58, and an event processing request permission register 59.

The interrupt factor detection unit 51 detects an interrupt factor. For example, the interrupt factor detection unit 51 of the functional blocks 50A, 50B, and 50C detects an interrupt factor generated in each of the functional blocks 50. For example, the interrupt factor detection unit 51 of the functional block 50D detects an interrupt factor based on an external event processing request outputted from a peripheral device not shown in the drawings. The interrupt factor detection unit 51 of each of the functional blocks 50 outputs an event processing request based on the detected interrupt factor to the event controller 40. The interrupt factor detection unit 51 may output event response processing data and parameters used for event response processing to the event controller 40 along with the event processing request.

The interrupt factor holding unit 52 holds the interrupt factor detected by the interrupt factor detection unit 51. In each of the functional blocks 50, when an event ID based on the interrupt factor held by the interrupt factor holding unit 52 is inputted, the interrupt factor held by the interrupt factor holding unit 52 is deleted. For example, when the inputted event ID corresponds to the interrupt factor held by the interrupt factor holding unit 52 according to the vector table, each of the functional blocks 50 deletes held event information.

The event ID input unit 53 receives an input of event ID outputted from the event controller 40. Further, the event ID input unit 53 is coupled with the MCU internal bus 65 and receives inputs of various data such as event response processing data and parameters through the MCU internal bus 65. The event ID input unit 53 outputs the inputted event ID and the like to, for example, the event response specification unit 54.

The event control register 55 stores event response information in which an event ID that requires response and response content are associated with each other for each functional block 50. For example, the event control register 55 of the functional block 50A stores event response information in which an event ID to which the functional block 50A should respond and response content are associated with each other. The same goes for the event control registers 55 of the other functional blocks 50B, 50C, and 50D.

The event response specification unit 54 determines whether or not the event ID inputted into the event ID input unit 53 is an event ID that requires response. When the event ID inputted into the event ID input unit 53 is an event ID that requires response, the event response specification unit 54 specifies response content corresponding to the inputted event ID. For example, the event response specification unit 54 determines whether or not the inputted event ID is an event ID that requires response by referring to the event response information stored in the event control register 55. When the inputted event ID is an event ID that requires response, the event response specification unit 54 specifies response content corresponding to the event ID that requires response based on the inputted event ID and the event response information.

The event response specification unit 54 outputs the specified response content to the event response processing unit 56. When outputting the specified response content, the event response specification unit 54 may output the event response processing data inputted along with the event ID to the event response processing unit 56.

An event ID to which each of the functional blocks 50 should respond and the response content for each event ID are arbitrarily set by, for example, a user of the microcomputer in accordance with an application system. FIGS. 3A and 3B are diagrams for explaining an example of a setting method of response content corresponding to an event ID. FIG. 3A is a diagram showing an example of a setting method of an event ID that requires response. FIG. 3B is a diagram showing an example of a setting method of response content corresponding to an event ID that requires response. The present example relates to the functional block 50A having a timer function.

In the functional block 50A, as shown in FIG. 3A, event IDs corresponding to specific operations related to the timer function (for example, counter start, event count, input capture, and the like) are set. In the event control register 55 of the functional block 50, for example, as shown in FIG. 3A, an event ID (EV_ID(0)) corresponding to ACT0 (counter start) is set, an event ID (EV_ID(1)) corresponding to ACT1 (event count) is set, and an event ID (EV_ID(2)) corresponding to ACT2 (input capture) or the like is set.

Further, for example, event response processing data and a parameter may be specified to each event ID. For example, a register using method of input capture is specified by a parameter. Specifically, whether or not to perform a so-called buffer operation is specified according to a value of specific bits in a parameter specification area of the event control register 55 set by the parameter. Alternatively, a value of the parameter is used for addition and subtraction of a compare register.

Response content corresponding to each event ID is set by, for example, a method shown in FIG. 3B. In the event control register 55 of the control block 50A, for example, by the method shown in FIG. 3B, response content for performing counter start can be set to CTR0, response content for performing event count can be set to CTR1, and response content for performing input capture can be set to CTR0, or the other response contents can be set. For example, as shown in FIG. 3B, each response content is set as a set of information including a specification of the event ID (EV_ID), a specification of the event control register 55 to be used (REG_SL), a specification of a bit whose setting is to be changed in the specified event control register 55 (WR_EN), and a specification of data to be written to the specified bit (WR_DT).

By writing predetermined data to a predetermined bit of a predetermined event control register 55 based on the set of information, the response content corresponding to each event ID is set. For example, when a CST bit that specifies count start is present in a bit 0 of the event control register 55 (TSTR) related to count start not shown in the drawings, by setting predetermined data (WR_DT(0), for example, "1") to a predetermined bit (WR_EN(0)) in an area of a predetermined event control register 55 (REG_SL(0)), response content related to counter start is set. When the count start is performed in two events, contents whose event IDs are different from each other may be set in CTR0 and CTR1. It is possible to set response content other than counter start, event count, and input capture to CTR0 to CTR2.

The event response processing unit 56 performs event response processing based on the response content specified by the event response specification unit 54. The event response processing unit 56 may perform event response processing based on, for example, the response content, the event response processing data, and the like, which are outputted from the event response specification unit 54.

Further, the event response processing unit 56 performs input/output of various data from/to a peripheral device. For example, the event response processing unit 56 receives an input of various data outputted from the peripheral device. The event response processing unit 56 may output the inputted various data to, for example, the interrupt factor detection unit 51. Further, the event response processing unit 56 may output, for example, various data inputted through the event ID input unit 53, data generated by the event response processing, and the like to the peripheral device.

The event response processing unit 56 of the functional block 50A performs event response processing related to the timer function. The event response processing unit 56 of the functional block 50A performs processing such as, for example, start of counter, event count, capture of counter (also referred to as input capture), and the like. Further, the event response processing unit 56 of the functional block 50A outputs data such as, for example, a count value received by the input capture to a peripheral device or the like.

The event response processing unit 56 of the functional block 50B performs, for example, input/output of serial data from/to a peripheral device. The event response processing unit 56 of the functional block 50B includes, for example, a serial communication interface (hereinafter also referred to as SCI) and performs input/output of serial data from/to the peripheral device through the SCI.

The event response processing unit 56 of the functional block 50B receives, for example, an input of serial data outputted from the peripheral device and converts the inputted serial data into parallel data. The event response processing unit 56 of the functional block 50B may output the converted parallel data to, for example, the interrupt factor detection unit 51 or the like. At this time, the event response processing unit 56 of the functional block 50B detects, for example, an interrupt factor based on input completion of the serial data outputted from the peripheral device and outputs an event processing request.

Further, the event response processing unit 56 of the functional block 50B converts data to be outputted to the peripheral device into serial data. The event response processing unit 56 of the functional block 50B converts data to be outputted to the peripheral device among, for example, data generated by the event response processing and data inputted into the event ID input unit 53, into serial data. The event response processing unit 56 of the functional block 50B outputs the converted serial data to the peripheral device through the SCI.

The event response processing unit 56 of the functional block 50C performs input/output of analog data from/to a peripheral device. The event response processing unit 56 of the functional block 50C includes, for example, an A/D converter that converts analog data into digital data and a D/A converter that converts digital data into analog data. The event response processing unit 56 of the functional block 50C receives, for example, an input of analog data outputted from the peripheral device and converts the inputted analog data into digital data by the A/D converter. The event response processing unit 56 of the functional block 50C performs event response processing based on, for example, the converted digital data. The event response processing unit 56 of the functional block 50C may output the converted digital data to, for example, the interrupt factor detection unit 51 or the like. The interrupt factor detection unit 51 of the functional block 50C detects, for example, an interrupt factor based on input completion of the analog data outputted from the peripheral device and outputs an event processing request.

Further, the event response processing unit 56 of the functional block 50C converts data to be outputted to the peripheral device into analog data. The event response processing unit 56 of the functional block 50C converts data to be outputted to the peripheral device among, for example, data generated by the event response processing and data inputted into the event ID input unit 53, into analog data by the A/D converter. The event response processing unit 56 of the functional block 50C outputs the converted analog data to the peripheral device.

The event response processing unit 56 of the functional block 50D receives an input of an external event processing request outputted from a peripheral device. The event response processing unit 56 of the functional block 50D outputs the inputted external event processing request to, for example, the interrupt factor detection unit 51. Further, the event response processing unit 56 of the functional block 50D outputs various data responding to the inputted external event processing request. The event response processing unit 56 of the functional block 50D outputs various data such as, for example, data inputted into the event ID input unit 53, data generated by the event response processing, and the like, to the peripheral device.

Figure 4A:
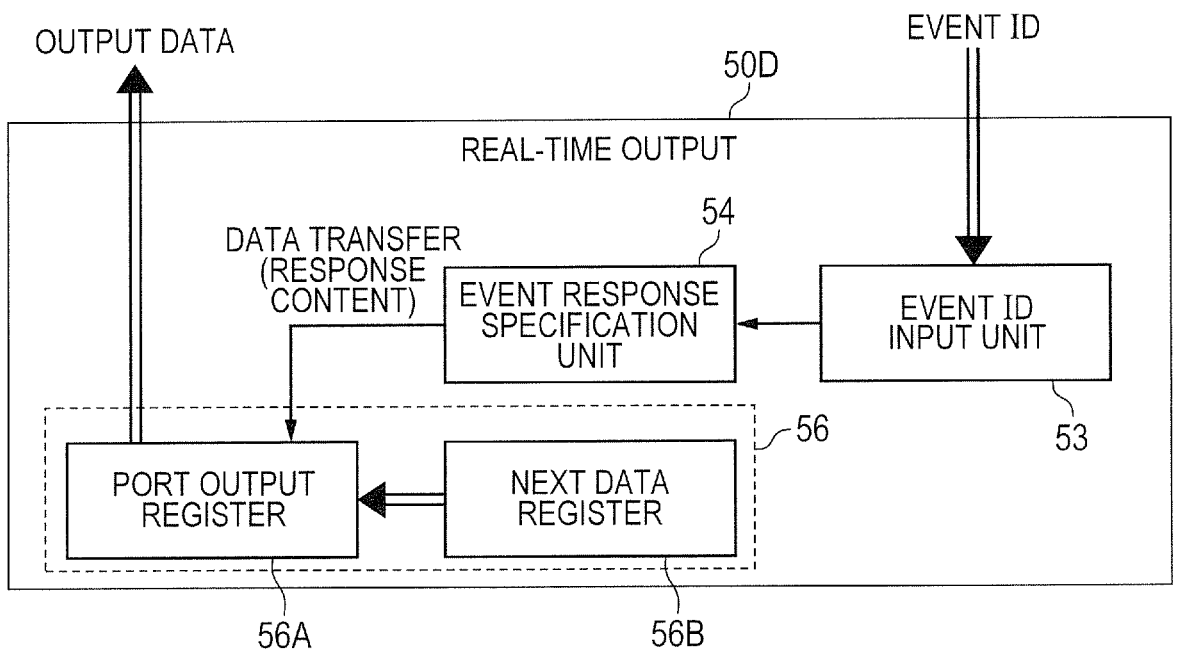
FIGS. 4A and 4B are diagrams for explaining an example of a data output method in a functional block that receives an input of an external event processing request.
Figure 4B:
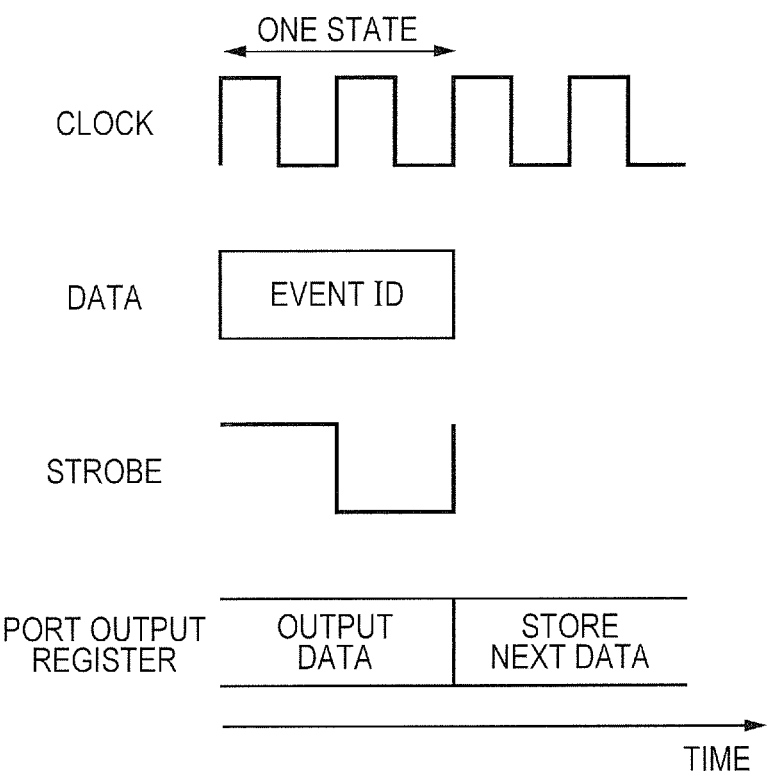

FIGS. 4A and 4B are diagrams for explaining an example of a data output method in a functional block that receives an input of an external event processing request. FIG. 4A is a diagram showing an example of a configuration of the functional block 50D. In FIG. 4A, only a part of the configuration of the functional block 50D. FIG. 4B is a diagram showing an example of timing related to data output in the functional block 50.

As shown in FIG. 4A, the event response processing unit 56 of the functional block 50D includes, for example, a port output register 56A and a next data register 56B.

The port output register 56A stores data to be outputted to the peripheral device. The next data register 56B stores nest data that will be outputted to the peripheral device next to the data stored in the port output register 56A. For example, when a predetermined event ID is inputted into the functional block 50D, the event response processing unit 56 outputs the data stored in the port output register 56A to the peripheral device. When the data stored in the port output register 56A is outputted, the next data stored in the next data register 56B is stored in the port output register 56A. In other words, the next data is transferred to the port output register 56A.

For example, an event transmission block 48 described later starts an event write cycle shown in FIG. 4B. As shown in FIG. 4B, for example, in a first one state, the event transmission block 48 outputs an event ID to the MCU internal bus 65 related to data. The event ID input unit 53 of the functional block 50D receives an input of event ID at, for example, a falling timing of a strobe signal shown in FIG. 4B. When receiving the input of event ID, the functional block 50D outputs the data stored in the port output register 56A to the peripheral device.

Then, the port output register 56A stores the next data transferred from the next data register 56B.

Then, the event response processing unit 56 of the functional block 50D stores data that will be outputted next to the next data into the next data register 56B. The functional block 50D may perform event response processing that outputs 1 or 0 according to the inputted event ID, for example, without the next data register being provided.

The event processing request permission register 59 stores event processing request permission information that defines whether or not to permit output of an event processing request. For example, the event processing request permission information is written to the event processing request permission register 59 by the central processing unit 10. In this way, writing, deletion, and the like are performed on the event processing request permission register 59 by, for example, the central processing unit 10.

The event processing request permission determination unit 58 shown in FIG. 2 includes an event processing request storage register (not shown in the drawings) that stores an event processing request outputted from, for example, the interrupt factor detection unit 51. When an event processing request is outputted from the interrupt factor detection unit 51, the event processing request storage register stores the event processing request. Each of the functional blocks 50 stores the event processing request by, for example, setting an interrupt factor flag of the event processing request storage register to a predetermined value (for example, "1").

The interrupt factor flag is set to "1" when, for example, the functional blocks 50A, 50B, and 50C of timer, communication, and analog become a predetermined state (an event occurs). Further, for example, the interrupt factor flag of the functional block 50D of external interrupt (I/O) is set to "1" when an external interrupt input terminal (for example, an input terminal of the event response processing unit 56) becomes a predetermined level or when a predetermined change occurs in a level of the external interrupt input terminal.

Further, the interrupt factor flag is cleared to "0" when an event ID based on the interrupt factor held by the interrupt factor holding unit 52 is inputted. Further, for example, when event response processing based on the event processing request is performed by the central processing unit 10, the interrupt factor flag is cleared to "0" by, for example, a write operation performed by the central processing unit 10.

The event processing request permission determination unit 58 determines whether or not to output the event processing request to the event controller 40 based on the event processing request permission information stored in the event processing request permission register 59. For example, when event processing request output permission information is written in the event processing request permission register 59, the event processing request permission determination unit 58 outputs the event processing request to the event controller 40. Specifically, for example, when the interrupt factor flag is set to a predetermined value and the event processing request output permission information that permits output of the event processing request is written in the event processing request permission register 59, the event processing request permission determination unit 58 outputs the event processing request to the event controller 40.

Figure 5:
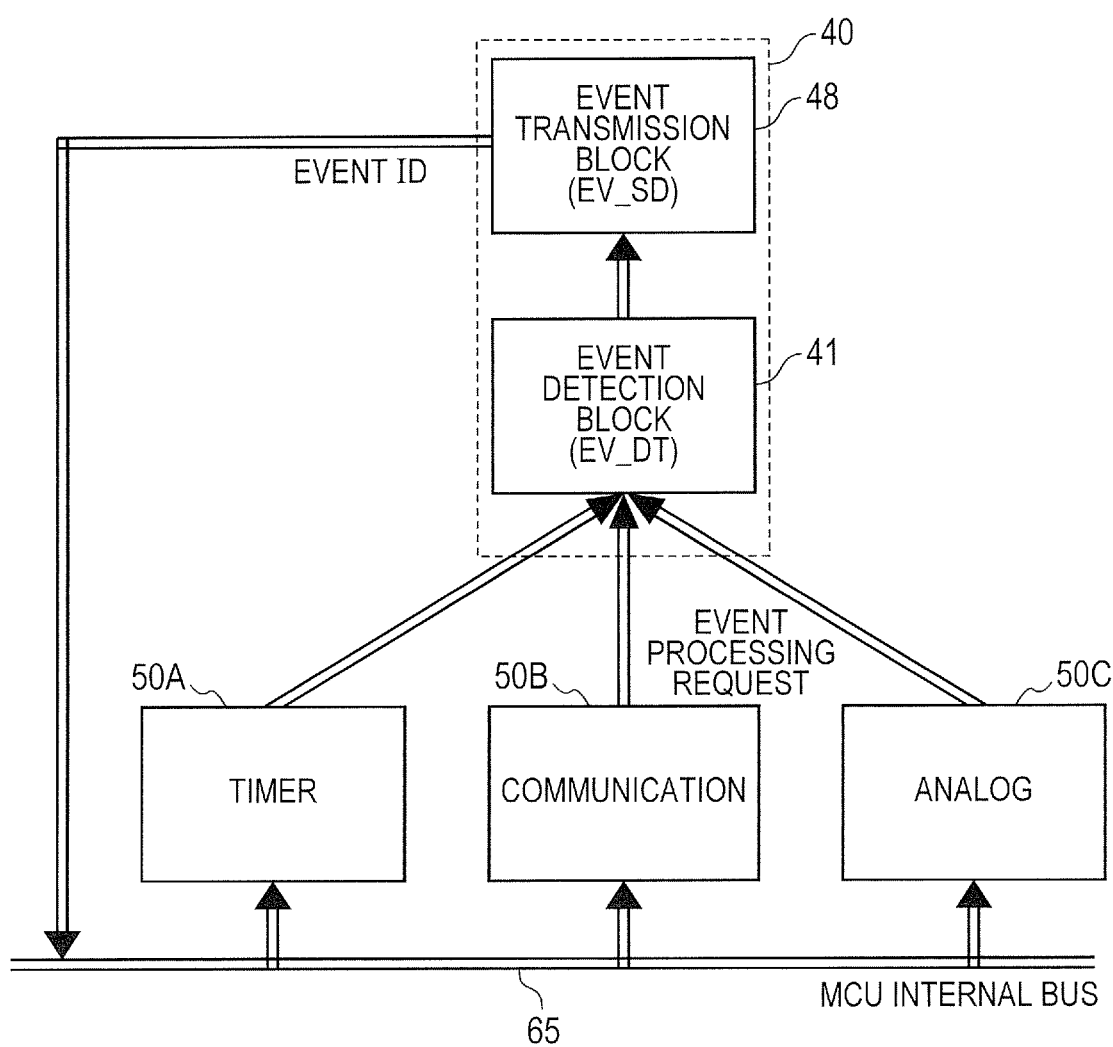
FIG. 5 is a diagram showing an example of an event response processing method.
Figure 6:
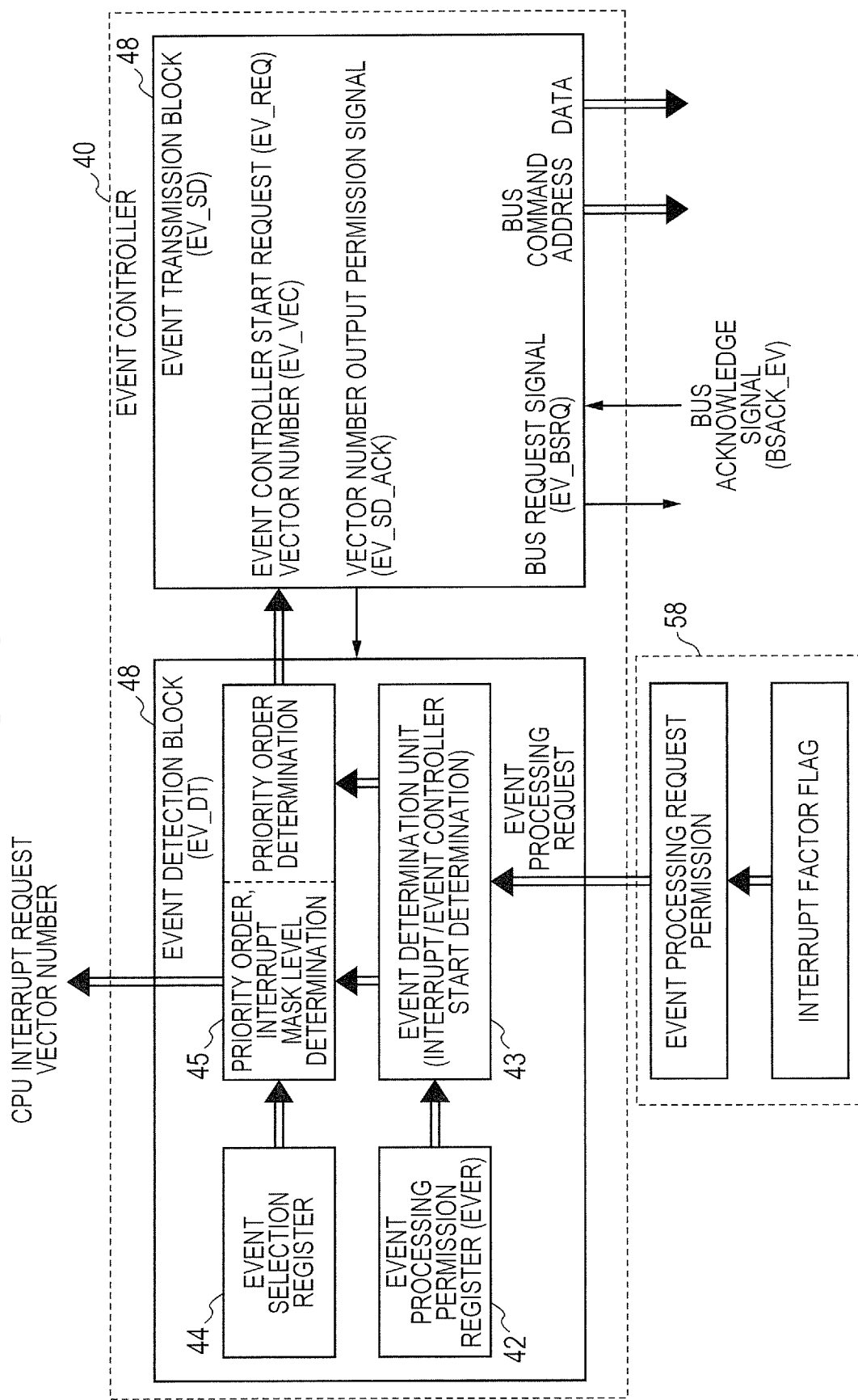
FIG. 6 is a diagram showing an example of a configuration of an event controller.

Next, the event controller 40 will be described. FIG. 5 is a diagram showing an example of an event response processing method. FIG. 6 is a diagram showing an example of a configuration of the event controller. The event controller 40 receives an input of the event processing request outputted from each functional block 50. Further, the event controller 40 arbitrates a plurality of inputted event processing requests and selects an event processing request to be processed. Further, the event controller 40 generates an event ID based on the selected event processing request and outputs the generated event ID to a plurality of functional blocks 50.

Further, the event controller 40 selects whether to interrupt the central processing unit 10 based on the selected event processing request or to start the event controller 40.

Further, the event controller 40 generates a vector number corresponding to the selected event processing request. When the event controller 40 interrupts the central processing unit 10, the event controller 40 outputs a CPU interrupt request for the central processing unit 10 and the vector number to the central processing unit 10. When the event controller 40 starts the event controller 40, the event controller 40 generates an event ID corresponding to the vector number and outputs the generated event ID to a plurality of functional blocks 50.

As shown in FIGS. 1, 5, and 6, the event controller 40 includes an event detection block 41 and an event transmission block 48. The event detection block 41 receives an input of event processing request outputted from each of the functional blocks 50. The event detection block 41 arbitrates a plurality of inputted event processing requests and selects an event processing request to be processed. The event detection block 41 selects whether to interrupt the central processing unit 10 based on the selected event processing request or to start the event controller 40. The event detection block 41 generates a vector number corresponding to the selected event processing request. When the event detection block 41 interrupts the central processing unit 10, as shown in FIG. 6, the event detection block 41 outputs a CPU interrupt request and the vector number to the central processing unit 10. When the event detection block 41 starts the event controller 40, as shown in FIG. 6, the event detection block 41 outputs an event controller start request (EV_REQ) and a vector number (EV_VEC) to the event transmission block 48.

As shown in FIG. 6, the event detection block 41 includes, for example, an event processing permission register 42, an event determination unit 43, an event selection register 44, an event selection unit 45, and the like.

The event processing permission register 42 stores event processing permission information that defines whether to interrupt the central processing unit 10 or to start the event controller 40. The event processing permission register 42 is provided with, for example, bits corresponding to each interrupt factor. In other words, the event processing permission information is set for each interrupt factor. The event processing permission information is written by, for example, the central processing unit 10.

The event determination unit 43 determines whether to interrupt the central processing unit 10 or to start the event controller 40 for each event processing request based on the event processing permission information stored in the event processing permission register 42. The event determination unit 43 outputs the determined event processing request to the event selection unit 45. At this time, the event determination unit 43 may output the event processing request to the event selection unit 45 along with a determination result and the event processing permission information.

The event selection register 44 stores priority information that defines priority for each interrupt factor. The event selection register 44 is provided with, for example, bits corresponding to each interrupt factor. In other words, the priority information is set for each interrupt factor.

Further, the event selection register 44 stores interrupt mask level information that defines whether or not the central processing unit 10 receives an interrupt. For example, the interrupt mask level information may be set for each interrupt factor or may be set according to a state of the central processing unit 10, such as a state where the central processing unit 10 is in a sleep mode.

The priority information and the interrupt mask level information are written by, for example, the central processing unit 10.

The event selection unit 45 arbitrates a plurality of event processing requests that are determined to interrupt the central processing unit 10 by the event determination unit 43 and selects an event processing request to be processed. The event selection unit 45 selects the event processing request to be processed based on, for example, the priority information stored in the event selection register 44. Specifically, the event selection unit 45 compares priority levels of each of the plurality of event processing requests that are determined to interrupt the central processing unit 10 and selects an event processing request whose priority is the highest as an event processing request that sends an interrupt request to the central processing unit 10.

The event selection unit 45 generates a vector number corresponding to the selected event processing request. The event selection unit 45 refers to a vector table stored in, for example, the read-only memory 20 or the like and reads the vector number corresponding to the selected event processing request.

The event selection unit 45 determines whether or not to interrupt the central processing unit 10 based on the interrupt mask level information stored in the event selection register 44. For example, when the interrupt mask level information which is written in the event selection register 44 indicates that the central processing unit 10 can accept the interrupt, the event selection unit 45 outputs a CPU interrupt request and the generated (read) vector number to the central processing unit 10.

Further, the event selection unit 45 arbitrates a plurality of event processing requests that are determined to start the event controller 40 by the event determination unit 43 and selects an event processing request to be processed. The event processing request to be processed is selected based on, for example, the priority information.

The event selection unit 45 generates a vector number corresponding to the event processing request selected to start the event controller 40. The vector number is generated based on, for example, the vector table described above. The event selection unit 45 outputs the event controller start request (EV_REQ) and the generated vector number (EV_VEC) to the event transmission block 48.

In this way, the event selection unit 45 independently selects the event processing request that sends an interrupt request to the central processing unit 10 and the event processing request that starts the event controller 40.

The event transmission block 48 receives an input of the event controller start request (EV_REQ) and the vector number (EV_VEC) outputted from the event detection block 41 (for example, the event selection unit 45). The event transmission block 48 generates an event ID corresponding to the inputted vector number (EV_VEC). The event transmission block 48 refers to the vector table stored in, for example, the read-only memory 20 or the like and reads an event ID corresponding to the inputted vector number. The event transmission block 48 starts, for example, an event write cycle and outputs the generated (read) event ID to a plurality of functional blocks 50 through the MCU internal bus 65.

Figure 7:
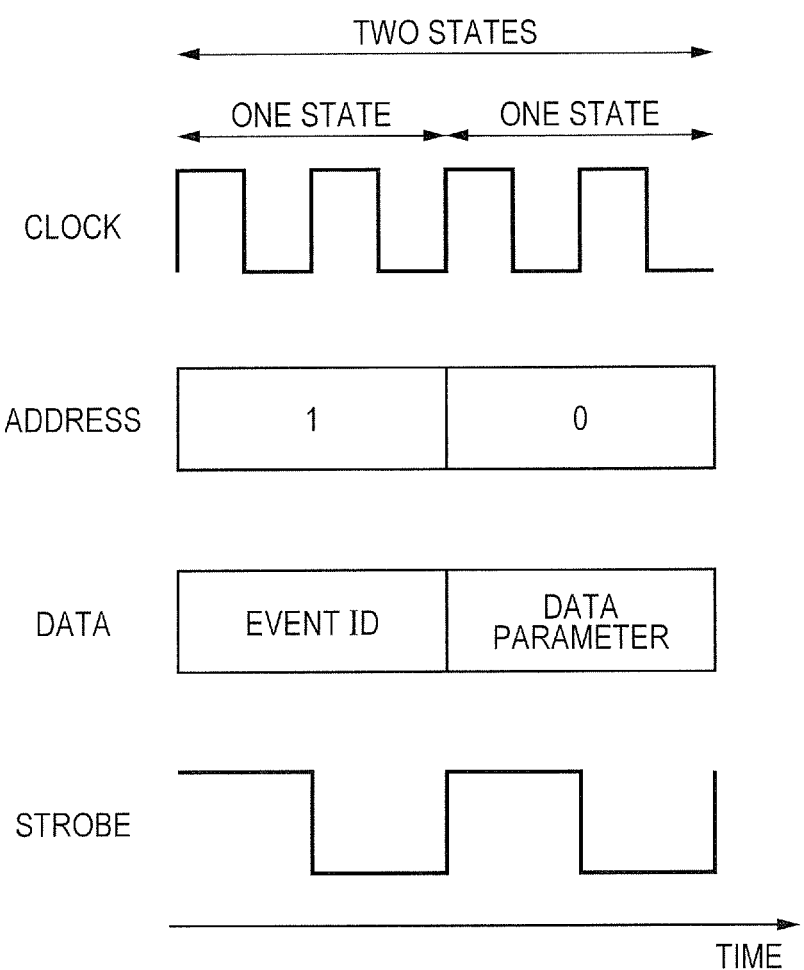
FIG. 7 is a diagram showing an example of an event write cycle when an event ID is outputted.

FIG. 7 is a diagram showing an example of the event write cycle when the event ID is outputted. In the event write cycle when the event ID is outputted, for example, as shown in FIG. 7, an event ID and the like are inputted and outputted for each two-state bus cycle. For example, information related to the number of output times of data is outputted to the MCU internal bus 65 for address (bus command). As shown in FIG. 7, for example, the event transmission block 48 outputs "1" to the MCU internal bus 65 for address in the first state (at the first time) and outputs "0" to the MCU internal bus 65 for address in the second state (at the second time). On the other hand, for example, the event transmission block 48 outputs the event ID to the MCU internal bus 65 for data at the first time and outputs event response data and parameters to the MCU internal bus 65 for data at the second time.

For example, at a falling timing of a strobe signal shown in FIG. 7, the event ID input unit 53 of the functional block 50 receives an input of the event ID at the first time and receives an input of the event response data and the parameters at the second time.

The event transmission block 48 may output the generated event ID to, for example, all the functional blocks 50 or to some of functional blocks 50. The functional blocks 50 to which the invent ID is inputted are specified by, for example, the bus controller 60. The event transmission block 48 need not output the event ID to, for example, a functional block 50 that performs event response processing without waiting for the input of the event ID. The event transmission block 48 may output event response data and parameters to each functional block along with the event ID.

The bus controller 60 performs arbitration of the MCU internal bus 65. The bus controller 60 performs the arbitration of the MCU internal bus 65 by performing interface of bus request, bus acknowledge, bus command, wait, address, data, and the like between, for example, the central processing unit 10, the event controller 40, the functional blocks 50, and the like. The bus controller 60 receives an input of a bus request signal outputted from, for example, the central processing unit 10 and the event controller 40 and performs the arbitration of the MCU internal bus 65. The bus controller 60 outputs a bus acknowledge signal to each component to which a permission to use the MCU internal bus 65 is given. Each component to which the bus acknowledge signal is inputted performs input/output of various data and the like from/to each component coupled through the MCU internal bus 65.

For example, when the central processing unit 10 receives an input of the bus acknowledge signal, the central processing unit 10 reads a command from, for example, the read-only memory 20 through the MPU internal bus 65 and writes data generated by executing the command into the random access memory 30. Further, when the central processing unit 10 receives an input of the bus acknowledge signal, the central processing unit 10 performs, for example, writing, deletion, and the like of various information on each register provided in the event controller 40 and the functional blocks 50 through the MCU internal bus 65.

As described above, the MCU internal bus 65 mediates input/output of various data and the like performed between each component. The MCU internal bus 65 includes, for example, a bus related to bus command and address and a bus related to data.

<Event Response Processing Method>

Next, an event response processing method in the microcomputer 1 of the present embodiment will be described. In each of the functional blocks 50, when the interrupt factor detection unit 51 detects an interrupt factor, the interrupt factor detection unit 51 outputs an event processing request based on the detected interrupt factor to the event processing request permission determination unit 58.

When event processing request permission information that permits an output of an event processing request is stored in the event processing request permission register 59 and the interrupt factor flag stored in the event processing request storage register is set to, for example, "1", the event processing request permission determination unit 58 outputs an event processing request to the event determination unit 43 of the event detection block 41. At this time, each event processing request permission determination unit 58 individually outputs the event processing request to the event determination unit 43 not through the MCU internal bus 65.

The event determination unit 43 determines whether to interrupt the central processing unit 10 or to start the event controller 40 for each event processing request based on the event processing permission information which is defined for each interrupt factor and stored in the event processing permission register 42. The event determination unit 43 outputs an event processing request to the event selection unit 45 along with, for example, a determination result and the event processing permission information.

The event selection unit 45 selects an event processing request to be processed by the central processing unit 10 from a plurality of event processing requests that interrupt the central processing unit 10 based on the priority information stored in the event selection register 44. Further, the event selection unit 45 refers to the vector table stored in, for example, the read-only memory 20 or the like and reads a vector number corresponding to the selected event processing request.

The event selection unit 45 refers to the interrupt mask level information stored in the event selection register 44, and when the central processing unit 10 receives an interrupt, the event selection unit 45 outputs a CPU interrupt request and the vector number to the central processing unit 10.

When the central processing unit 10 receives an input of the CPU interrupt request and the vector number, the central processing unit 10 interrupts execution of a command that is currently being executed, and performs interrupt processing based on the CPU interrupt request. When the central processing unit 10 completes the interrupt processing, the central processing unit 10 resumes the interrupted execution of the command.

The central processing unit 10 sets an interrupt factor flag stored in, for example, an event processing request detection register (not shown in the drawings) of the functional block 50 that outputs an event processing request related to interrupt processing to a predetermined value "0". In the functional block 50 that has outputted the event processing request related to interrupt processing, the interrupt factor held by the interrupt factor holding unit 52 is deleted.

Further, the event selection unit 45 selects an event processing request to be processed from a plurality of event processing requests that start the event controller 40 based on the priority information stored in the event selection register 44. Further, the event selection unit 45 refers to the vector table stored in, for example, the read-only memory 20 or the like and reads a vector number corresponding to the selected event processing request.

The event selection unit 45 outputs the event controller start request (EV_REQ). When the event transmission block 48 receives an input of the event controller start request (EV_REQ), the event transmission block 48 outputs a vector number output permission signal (EV_SD_ACK) that permits output of the vector number. When the event selection unit 45 receives an input of the vector number output permission signal (EV_SD_ACK), the event selection unit 45 outputs the vector number (EV_VEC) to the event transmission block 48.

When the event transmission block 48 receives an input of the vector number, the event transmission block 48 generates an event ID corresponding to the inputted vector number according to the vector table.

The event transmission block 48 outputs a bus request signal (EV_BSRQ) to the bus controller 60. When the bus controller 60 receives an input of the bus request signal (EV_BSRQ), the bus controller 60 arbitrates exclusive possession of the MCU internal bus 65 and outputs a bus acknowledge signal (BSACK_EV) to the event transmission block 48. Further, the bus controller 60 starts the MCU internal bus 65, and non-selectively activates a selection signal of a functional block 50 or activates selection signals of a plurality of functional blocks 50.

When the event transmission block 48 receives an input of the bus acknowledge signal (BSACK_EV), the event transmission block 48 starts an event write cycle and outputs an event ID to each of the functional blocks 50.

The event ID input unit 53 of each of the functional blocks 50 receives an input of the event ID. The event response specification unit 54 of each of the functional blocks 50 refers to the event response information stored in the event control register 55, and when the inputted event ID is an event ID that requires response, the event response specification unit 54 specifies response content in accordance with the event ID and outputs the response content to the event response processing unit 56. The event response processing unit 56 performs response processing in accordance with the inputted response content.

(Case when Interrupt Factors Occur at the Same Time)

Figure 8:
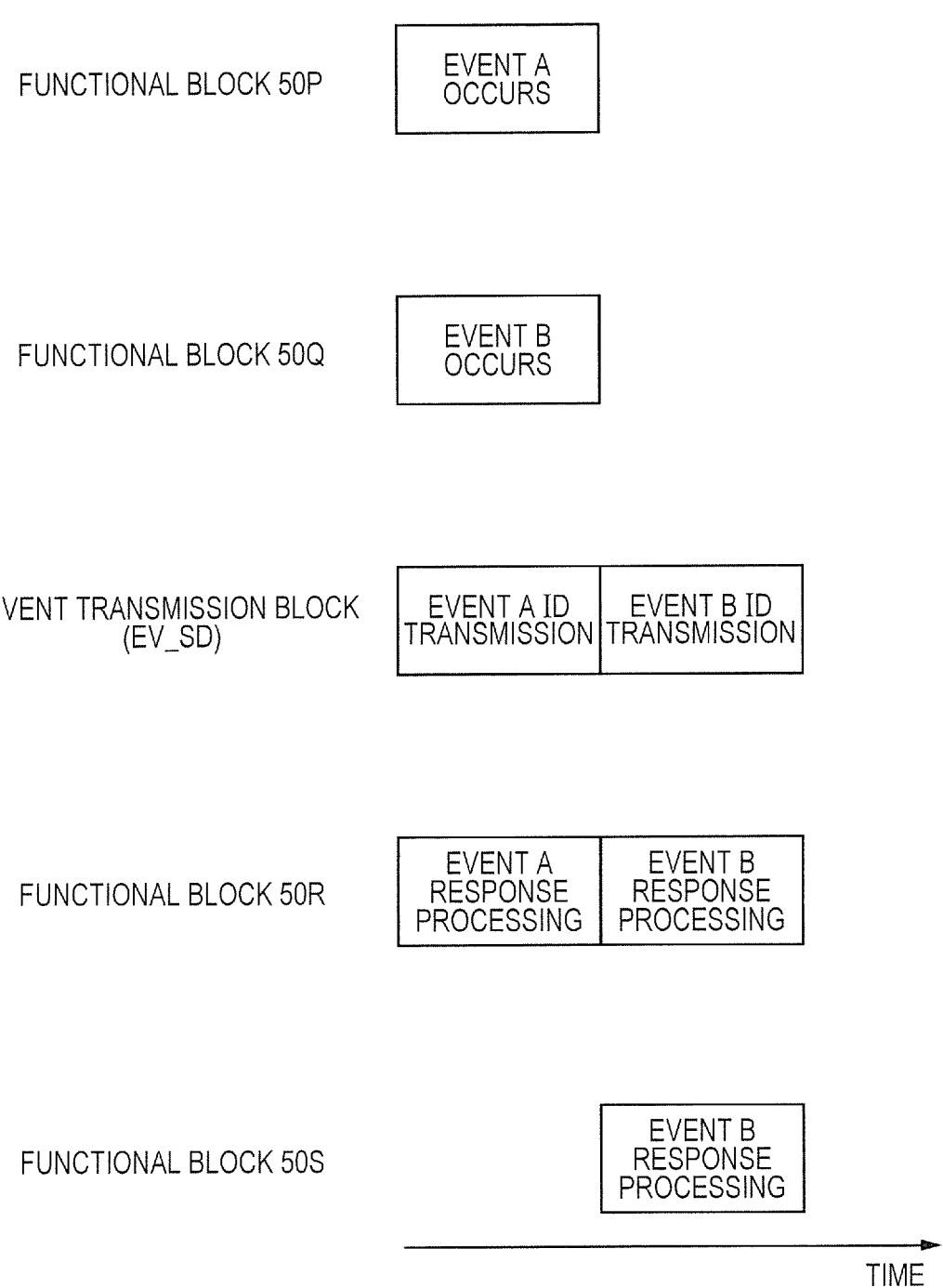
FIG. 8 is a diagram showing an example of an event response processing method when a plurality of interrupt factors occur at the same time.

Next, the event response processing when a plurality of events (interrupt factors) occur at the same time will be described. FIG. 8 is a diagram showing an example of an event response processing method when a plurality of interrupt factors occur at the same time. FIG. 8 shows processing content of each of a plurality of functional blocks 50P (50), 50Q (50), 50R (50), and 50S (50) and the event transmission block 48.

As shown in FIG. 8, in the functional blocks 50P and 50Q, events (interrupt factors) A and B of their own occur at the same time. The functional blocks 50P and 50Q respectively output their event processing requests related to the events A and B to the event controller 40.

The event selection unit 45 refers to the priority information stored in the event selection register 44 and selects event processing requests to be processed in order from the event A to the event B. In other words, the event selection unit 45 outputs the vector number of the event processing request based on the event A to the event transmission block 48 in preference to the vector number of the event processing request based on the event B.

The event transmission block 48 starts, for example, a two-state event write cycle described above and outputs an event ID, event response processing data, and parameters related to the event processing request based on the event A to the functional blocks 50P to 50S. When the event ID is inputted into the functional block 50R, as shown in FIG. 8, the functional block 50R performs event response processing related to the event A.

Then, the event transmission block 48 outputs an event ID, event response processing data, and parameters related to the event processing request based on the event B to the functional blocks 50P to 50S. When the event ID is inputted into the functional blocks 50R and 50S, as shown in FIG. 8, the functional blocks 50R and 50S perform event response processing related to the event B.

As a specific example, the functional block 50P includes a serial communication interface (SCI), the functional block 50Q includes a timer, the functional block 50R includes a data transfer function, and the functional block 50S includes a real-time output (corresponding to FIG. 4A). For example, the functional block 50P outputs an event processing request according to reception completion of SCI (event A), and the functional block 50Q outputs an event processing request according to comparison match of timer (event B). The functional block 50R starts the data transfer function and prepares response data based on the event processing request outputted from the functional block 50P (SCI) (event A response processing), starts the data transfer function and performs data transfer to a compare register of the timer based on the event processing request outputted from the functional block 50Q (timer), and resets the compare register to set next comparison match time. Further, the functional block 50S (real-time output) transfers next data based on the event processing request outputted from the functional block 50Q (timer).

<Effects of Present Embodiment>

According to the present embodiment, the event ID outputted from the event controller 40 is inputted into a plurality of functional blocks 50. Each of the functional blocks 50 determines whether or not the inputted event ID is an event ID that requires response, and when the inputted event ID is an event ID that requires response, the functional block 50 performs event response processing corresponding to the inputted event ID.

According to this configuration, combinations corresponding to each of events (interrupt factors) occurring in each of the functional blocks 50 need not be realized by hardware in the event controller 40, such as hardware in which individual control signals are provided. Therefore, it is possible to process various events while suppressing complication of logical configuration. Further, according to this configuration, the event response processing is performed in the functional block 50 without requiring the central processing unit 10, so that the load of the central processing unit 10 is reduced. Further, time from detection of an interrupt factor to the event response processing is shortened, so that responsiveness is improved. Further, according to this configuration, a user or an application system designates a functional block 50 that responds, and thereby the event response processing is flexibly performed.

Further, according to this configuration, the event response processing by a plurality of functional blocks 50 is realized for one event ID. Thereby, various operations are realized as the microcomputer 1.

Further, according to this configuration, the output of event ID is exclusively performed by the event controller 40, so that the output of a plurality of event processing requests is not performed at the same time. Therefore, the event response processing is easily performed.

Further, according to this configuration, the event ID is outputted through the MCU internal bus 65, so that an additional logic configuration is minimum. Further, in the event response processing, competition of reading/writing by the central processing unit 10 is excluded, so that the event response processing is easily performed.

Further, according to the present embodiment, the response content corresponding to an event ID is arbitrarily set according to the function of each of the functional blocks 50. Thereby, not only the start and stop of operation, but also complicated functions are realized by the event response processing data and parameters.

Further, according to the present embodiment, the response content is set by writing to the event control register 55 or the like, so that an additional logic to the existing functions is suppressed to minimum. For example, the writing to the event control register 55 or the like is performed easily as compared with writing by a data transfer device such as a so-called DMA controller.

Further, according to the present embodiment, when an event ID based on the interrupt factor held by the interrupt factor holding unit 52 is inputted, the interrupt factor held by the interrupt factor holding unit 52 is deleted. According to this configuration, the interrupt factor is not deleted until a predetermined event ID is inputted, so that it is possible to easily determine whether or not event response processing based on the interrupt factor has been performed.

Further, according to the present embodiment, the event response specification unit 54 specifies response content based on the event ID inputted into the event ID input unit 53 and the event response information stored in the event control register 55. According to this configuration, the event response specification unit 54 can determine whether or not the inputted event ID is an event ID that requires response based on the event response information, so that it is possible to appropriately specify event response processing corresponding to an event ID that requires response.

Further, according to the present embodiment, each of the functional blocks 50 includes the event processing request permission register that stores the event processing request permission information and the event processing request permission determination unit 58 that determines whether or not to output the event processing request to the event controller 40 based on the event processing request permission information. According to this configuration, the functional block 50 determines whether or not to output the event processing request based on the event processing request permission information, so that it is possible to output the event processing request at an appropriate timing according to a use situation of the microcomputer 1.

Further, according to the present embodiment, the interrupt factor detection unit 51 outputs the event response processing data and parameters used for the event response processing to the event controller 40 along with the event processing request. According to this configuration, the event transmission block 48 can output the event response processing data and parameters to the functional block 50 along with the event ID, so that various event response processing according to the event response processing data and parameters is performed.

Further, according to the present embodiment, the functional block 50A performs event response processing related to the timer function. According to this configuration, the functional block 50A has a time measuring function, so that the functional block 50A can perform, for example, start of counter, event count, input capture, and the like.

Further, according to the present embodiment, the functional block 50B is coupled to a peripheral device, and the event response processing unit 56 performs input/output of serial data from/to the peripheral device. According to this configuration, it is possible to couple with a peripheral device that performs serial communication, so that an application range of the microcomputer 1 is extended.

Further, according to the present embodiment, the functional block 50C is coupled to a peripheral device, and the event response processing unit 56 performs input/output of analog data from/to the peripheral device. According to this configuration, it is possible to couple with a peripheral device that performs input/output of analog data, so that the application range of the microcomputer 1 is extended.

Further, according to the present embodiment, the functional block 50D is coupled to a peripheral device and receives an input of external event processing request outputted from the peripheral device. The interrupt factor detection unit 51 of the functional block 50D detects an interrupt factor based on the inputted external event processing request. According to this configuration, the functional block 50D can perform event response processing based on the external event processing request, so that the application range of the microcomputer 1 is extended.

Further, according to the present embodiment, the event response processing unit 56 of the functional block 50D includes the port output register 56A that stores data to be outputted to the peripheral device and the next data register 56B that stores nest data. In the event response processing unit 56 of the functional block 50D, when the data stored in the port output register 56A is outputted, the next data is stored into the port output register 56A. According to this configuration, data to be outputted to the peripheral device is prepared in advance, so that event response processing related to data output is accelerated.

Further, according to the present embodiment, the event controller 40 selects whether to interrupt the central processing unit 10 based on the selected event processing request or to start the event controller 40. According to this configuration, the event response processing is performed not only in the functional block 50 but also in the central processing unit 10, so that a transmission method of the event processing request is selected in accordance with urgency. Thereby, the event response processing is appropriately performed.

Also thereby, it is possible to reduce the number of interrupts to the central processing unit 10 and/or adjust a period of time when the central processing unit 10 is in a low power consumption state, so that power consumption is reduced. Further, it is not necessary to perform exception processing, a stack saving/restoring operation, a restoration command, and the like, which are performed during interrupt processing of the central processing unit 10, so that a program is simplified and a system is streamlined.

Further, according to the present embodiment, the event controller 40 generates a vector number corresponding to the selected event processing request. When the event controller 40 interrupts the central processing unit 10, the event controller 40 outputs a CPU interrupt request for the central processing unit 10 and the vector number to the central processing unit 10. When the event controller 40 starts the event controller 40, the event controller 40 generates an event ID corresponding to the vector number and outputs the generated event ID to a plurality of functional blocks. According to this configuration, in the central processing unit 10, a predetermined command based on the inputted vector number is executed, so that event response processing related to the CPU interrupt request is promptly performed.

Further, according to the present embodiment, the event controller 40 includes the event detection block 41 and the event transmission block 48. According to this configuration, it is possible to cause the event transmission block 48 to be in a sleep state in which the event transmission block 48 does not perform processing related to generation and/or output of an event ID until an event controller start request is inputted, so that power consumption is reduced.

Further, according to the present embodiment, the event detection block 41 includes the event processing permission register 42 that stores event processing permission information, the event determination unit 43 that determines whether to interrupt the central processing unit 10 or to start the event controller 40 for each event processing request based on the event processing permission information, and the event selection unit 45 that performs various processing related to selection of an event processing request that will be processed by the central processing unit 10, selection of an event processing request that starts the event controller 40, and the like. According to this configuration, the event selection unit 45 can independently select an event processing request that interrupts the central processing unit 10 and an event processing request that starts the event controller 40, so that an event processing request to be processed in each case is easily selected.

Further, according to the present embodiment, the event detection block 41 includes the event selection register 44 that stores priority information that defines priority for each interrupt factor, and the event selection unit 45 selects an event processing request to be processed based on the priority information. According to this configuration, an event processing request based on an interrupt factor with the highest priority is selected, so that an event processing request to be processed is more easily selected. Thereby, the event response processing in the microcomputer 1 is smoothly performed.

Further, according to the present embodiment, the event selection register 44 stores interrupt mask level information that defines whether or not the central processing unit 10 receives an interrupt, and the event selection unit 45 determines whether or not to interrupt the central processing unit 10 based on the interrupt mask level information. According to this configuration, the event selection unit 45 determines whether or not to interrupt the central processing unit 10 according to a state of the central processing unit 10, so that the event response processing is performed while the load of the central processing unit 10 is suppressed.

Second Embodiment

Next, a second embodiment of the present invention will be described.

Figure 9:
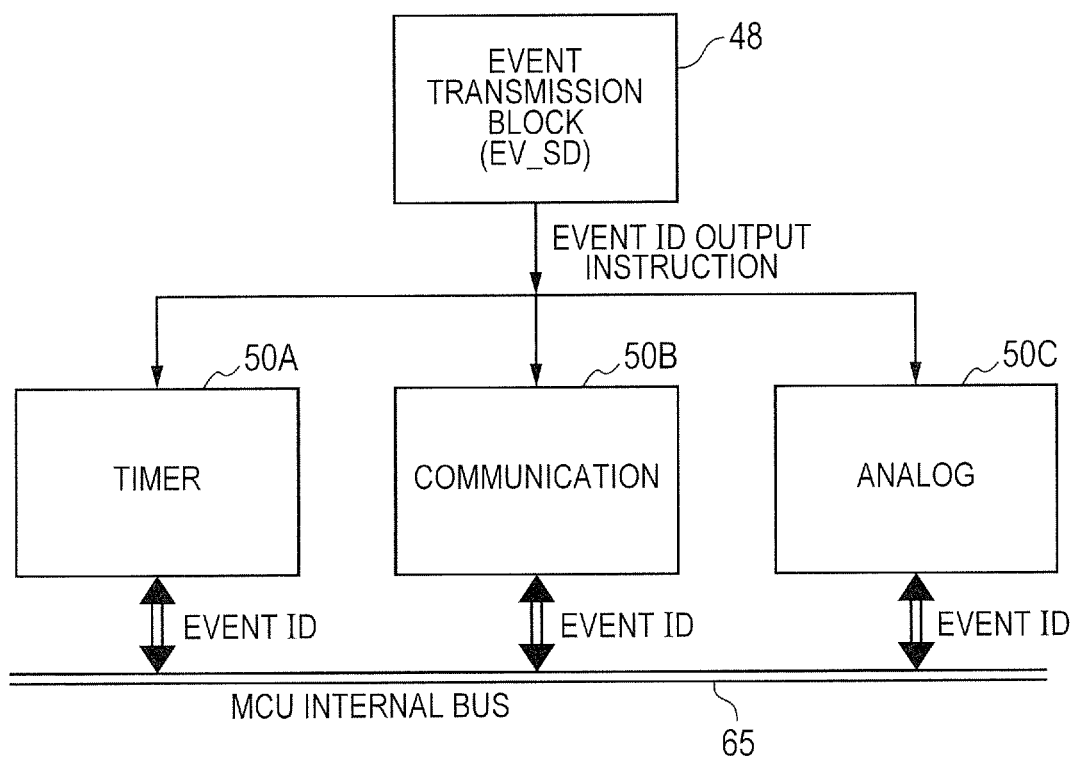
FIG. 9 is a diagram showing an example of an event ID output method.

Hereinafter, description of components that are the same as those in the embodiment described above will be omitted in principle. In the present embodiment, a case will be described in which an event ID is outputted from the functional block 50 and the event response processing is performed. FIG. 9 is a diagram showing an example of an event ID output method.

The event controller 40 outputs an event ID output instruction, which causes a functional block 50 that has outputted a selected event processing request to output an event ID, to the functional block 50. Specifically, when the event controller 40 is started and an event processing request to be processed is selected, as shone in FIG. 9, the event transmission block 48 outputs an event ID output instruction, which causes a functional block 50 that has outputted the selected event processing request to output an event ID, to the functional block 50.

The functional block 50 into which the event ID output instruction is inputted outputs an event ID based on the selected event processing request to a plurality of functional blocks 50. For example, the event transmission block 48 may output the event ID output instruction through the MCU internal bus 65 or may individually output the event ID output instruction.

When the event ID output instruction is inputted into a functional block 50, the functional block 50 outputs an event ID corresponding to the interrupt factor held by the interrupt factor holding unit 52 to a plurality of functional blocks 50 according to the vector table. The functional block 50 may output the event response processing data, parameters, and the like along with the event ID. The functional block 50 starts, for example, an event write cycle and outputs the event ID and the like through the MCU internal bus 65.

The event ID input units 53 of a plurality of functional blocks 50 receive an input of the event ID and the like outputted from the functional block 50. The functional block 50 that has outputted the event ID may also receive an input of the event ID outputted from the functional block 50 itself. Each of the functional blocks performs event response processing based on the inputted event ID.

According to the present embodiment, an event ID and the like are outputted from the functional block 50, so that a logical configuration of the event controller 40 is further simplified.

Third Embodiment

Next, a third embodiment of the present invention will be described.

Hereinafter, description of components that are the same as those in the embodiment described above will be omitted in principle. In the present embodiment, another example of a case in which the event response processing is performed based on an event ID outputted from a functional block 50 will be described.

The event controller 40 outputs an event ID output instruction, which causes functional blocks to output an event ID, to the functional blocks. For example, the event controller 40 sequentially outputs the event ID output instruction to each of the functional blocks 50. For example, the event transmission block 48 sequentially outputs the event ID output instruction to each of the functional blocks 50. The functional block 50 into which the event ID output instruction is inputted outputs an event ID based on the interrupt factor held by the interrupt factor holding unit 52.

In this way, in the present embodiment, each of the functional blocks 50 need not output an event processing request to the event controller 40. Therefore, for example, it is possible for the event controller 40 to include only the event transmission block 48 without including the event detection block 41.

Further, the event controller 40 outputs the event ID output instruction to the functional block 50 at, for example, predetermined intervals. The event transmission block 48 may output the event ID output instruction at predetermined intervals while, for example, changing the functional block 50 of output destination. Further, the event transmission block 48 may output the event ID output instruction to the same functional block 50 at predetermined intervals while, for example, appropriately changing the output destination.

Further, the event controller 40 may change the number of output times of the event ID output instruction, for example, for each functional block 50.

According to the present embodiment, the event controller 40 sequentially outputs the event ID output instruction to each of the functional blocks 50. According to this configuration, an event ID is sequentially outputted from each of the functional blocks 50, so that the event response processing based on the interrupt factor detected in each of the functional blocks is reliably performed.

Further, according to the present embodiment, the event ID output instruction is outputted from the event transmission block 48 while an event processing request to be processed is not selected, so that it is possible to perform the event response processing without outputting the event processing request. Further, it is not necessary to select an event processing request to be processed, so that the configuration of the event controller 40 is simplified. Thereby, the power consumption is reduced.

Further, according to the present embodiment, the event controller 40 outputs the event ID output instruction to the functional block 50 at predetermined intervals. According to this configuration, an event ID is outputted from the functional block 50 at predetermined intervals, so that the event response processing is performed at predetermined intervals. Thereby, it is possible to suppress variation of intervals at which the event response processing is performed.

Further, according to the present embodiment, the event transmission block 48 outputs the event ID output instruction to each of the functional blocks 50 at predetermined intervals while appropriately changing the output destination. According to this configuration, while an event ID is outputted from a plurality of functional block 50, an event ID is outputted from each of the functional blocks 50 at predetermined intervals, so that it is possible to suppress variation of the number of output times of event ID in a plurality of functional blocks 50.

Further, according to the present embodiment, the event transmission block 48 changes the number of output times of the event ID output instruction, for example, for each functional block 50. According to this configuration, it is possible to adjust the number of output times of the event ID output instruction according to the frequency at which the event response processing is performed, so that the event response processing is efficiently performed.

Fourth Embodiment

Figure 10:
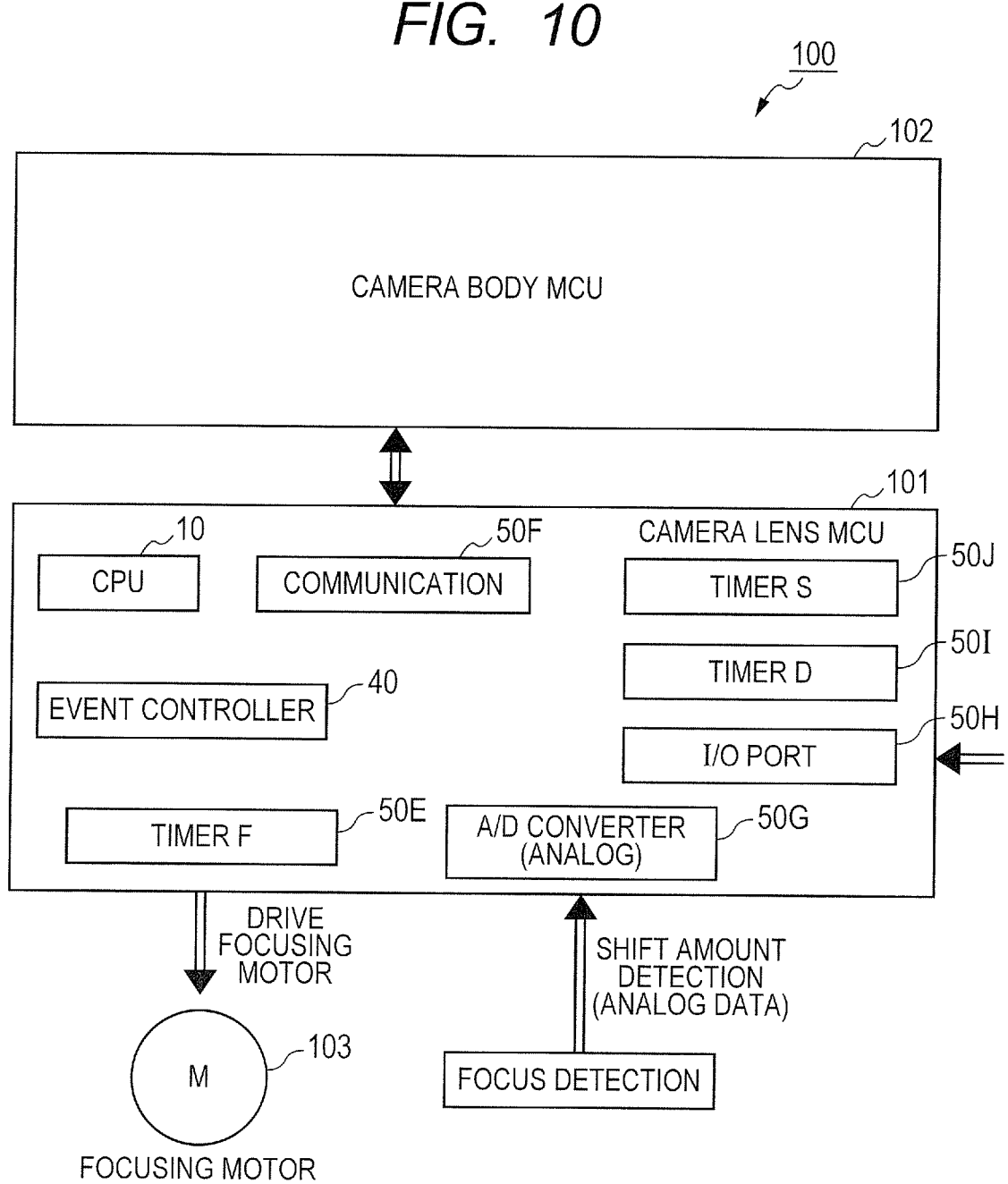
FIG. 10 is a diagram showing an example of a configuration of a camera according to a fourth embodiment of the present invention.

Next, a fourth embodiment of the present invention will be described. Hereinafter, description of components that are the same as those in the embodiment described above will be omitted in principle. In the present embodiment, a case in which the microcomputer 1 is applied to a camera will be described. FIG. 10 is a diagram showing an example of a configuration of the camera according to the fourth embodiment of the present invention. The camera 100 includes a camera lens MCU (microcomputer) 101, a camera body MCU 102, a camera lens focusing motor 103, and the like.

As shown in FIG. 10, the camera lens MCU 101 includes, for example, a central processing unit 10, an event controller 40, a functional block (timer F) 50E, a functional block (communication) 50F, a functional block (A/D converter) 50G, a functional block (I/O port) 50H, a functional block (timer D) 50I, a functional block (timer S) 50J, and the like.

The functional blocks 50E, 50I, and 50J have, for example, a timer function. The functional block 50F has, for example, a communication function. The functional block 50G has, for example, an A/D conversion function that converts inputted analog data into digital data.

The functional blocks 50E, 50I, and 50J having timer function perform, for example, event response processing related to focus, aperture, and vibration control of lens independently from each other. For example, the event response processing related to focus is performed by a plurality of functional blocks 50E and 50G. As shown in FIG. 10, the functional block 50G receives, for example, an input of a detected amount of focus shift (analog data) and converts the inputted amount of focus shift into digital data. When the functional block 50G completes the data conversion, the functional block 50G outputs an event processing request. At this time, the functional block 50G outputs, for example, the amount of focus shift that has been converted into digital data along with the event processing request.

When the functional block 50E receives an input of an event ID based on the event processing request outputted from the functional block 50G and the amount of focus shift, the functional block 50E performs event response processing that drives the focusing motor 103 based on the amount of focus shift.

For example, the functional module 50E drives the focusing motor 103 by starting a timer based on the amount of focus shift converted into digital data and adjusts the focus of the camera lens. Further, the functional block 50E performs acceleration/deceleration of the focusing motor 103 by, for example, performing addition/subtraction of a compare register of the timer.

The functional block 50F transmits and receives serial data to and from the camera body MCU 102 coupled through, for example, SCI. Many operations in the camera lens MCU 101 are performed based on an event processing request based on completion of reception of serial data outputted from the camera body MCU 102 through SCI.

For example, when the functional block 50F outputs an event response processing request based on input completion of serial data outputted from the camera body MCU 102, the functional blocks 50E and 50G start and perform various event response processing related to drive of the focusing motor 103 described above.

The functional block 50H receives an input of an external event processing request related to switch operations or the like related to, for example, permission of auto focus and control of vibration.

The camera lens MCU 101 performs various event response processing based on input completion of serial data outputted from the camera body MCU 102 or the like through the event controller, and thereby high-speed event response processing is achieved.

While the invention made by the inventors has been specifically described based on the embodiments, it is needless to say that the invention is not limited to the embodiments that have been described heretofore, but can be variously changed without departing from the scope of the invention.

For example, details of the bus controller 60 and bus operations such as a bus right and wait are omitted. However, these can be appropriately implemented.

In the above description, a case is described where the invention made by the inventors is applied to a microcomputer that is a background utilization field. However, the semiconductor device of the present invention is not limited to this. The present invention can be applied to, for example, a semiconductor device such as a digital signal processor (DSP) and a semiconductor device containing a functional block that can handle at least an event.

What is claimed is:

1. A semiconductor device comprising:
a central processing unit;
a plurality of functional blocks, each functional block configured to output an event processing request based on an interrupt factor; and
an event controller that is configured to:
receive input of event processing requests outputted from one or more of the functional blocks,
arbitrate the inputted event processing requests,
select one of the event processing requests to be processed,
generate an event ID based on the selected event processing request, and
output the generated event ID to one or more of the plurality of the functional blocks,
wherein each of the functional blocks includes:
an interrupt factor detection unit that detects the interrupt factor and outputs the event processing request based on the interrupt factor,
an event ID input unit that receives an input of the event ID outputted from the event controller,
an event response specification unit that determines whether or not the inputted event ID is one that requires response and, when the inputted event ID is one that requires response, specifies response content corresponding to the inputted event ID, and
an event response processing unit that performs event response processing based on the specified response content without requiring the central processing unit.

2. The semiconductor device according to claim 1,
wherein each of the functional blocks includes an interrupt factor holding unit that holds the interrupt factor, and
wherein when the event ID based on the interrupt factor held by the interrupt factor holding unit is inputted into the corresponding functional block, the interrupt factor held by the interrupt factor holding unit is deleted.

3. The semiconductor device according to claim 1,
wherein each of the functional blocks includes an event control register that stores event response information in which the event ID that requires response and the response content are associated with each other, and
wherein the event response specification unit specifies the response content based on the event ID inputted into the event ID input unit and the event response information.

4. The semiconductor device according to claim 1,
wherein each of the functional blocks includes:
an event processing request permission register that stores event processing request permission information that defines whether or not to permit output of the event processing request, and
an event processing request permission determination unit that determines whether or not to output the event processing request to the event controller based on the event processing request permission information.

5. The semiconductor device according to claim 1,
wherein each interrupt factor detection unit outputs event response processing data used for the event response processing to the event controller along with the event processing request.

6. The semiconductor device according to claim 1,
wherein any of the functional blocks performs the event response processing related to a timer function.

7. The semiconductor device according to claim 1,
wherein any of the functional blocks is coupled with a peripheral device, and
wherein the event response processing unit performs input/output of serial data from/to the peripheral device.

8. The semiconductor device according to claim 1,
wherein any of the functional blocks is coupled with a peripheral device, and
wherein the event response processing unit performs input/output of analog data from/to the peripheral device.

9. The semiconductor device according to claim 1,
wherein any of the functional blocks is coupled with a peripheral device and receives an input of an external event processing request outputted from the peripheral device, and
wherein the interrupt factor detection unit detects the interrupt factor based on the inputted external event processing request.

10. The semiconductor device according to claim 9,
wherein the event response processing unit of the functional block that receives the input of the external event processing request includes a port output register that stores data to be outputted to the peripheral device and a next data register that stores next data that will be outputted to the peripheral device after the data stored in the port output register, and
wherein when the data stored in the port output register is outputted, the next data is stored in the port output register.

11. A semiconductor device comprising:
a central processing unit;
a plurality of functional blocks, each functional block configured to output an event ID based on an interrupt factor; and
an event controller that outputs an event ID output instruction, which causes one or more of the functional blocks to output the corresponding event ID to others of the functional blocks,
wherein each of the functional blocks includes:
an interrupt factor detection unit that detects the interrupt factor, generates the event ID based on the interrupt factor, and outputs the generated event ID,
an event ID input unit that receives an input of the event ID,
an event response specification unit that determines whether or not the inputted event ID is one that requires response and, when the inputted event ID is one that requires response, specifies response content corresponding to the inputted event ID, and an event response processing unit that performs event response processing related to the specified response content without requiring the central processing unit, wherein the one or more functional blocks, into which the event ID output instruction is inputted, outputs the event ID to the others of the plurality of functional blocks, and wherein the event ID input unit of each of the others of the plurality of functional blocks receives the event ID outputted from the one or more functional blocks.

12. The semiconductor device according to claim 11, wherein the event controller sequentially outputs the event ID output instruction to each of the functional blocks.

13. The semiconductor device according to claim 11, wherein the event controller sequentially outputs the event ID output instruction to the functional blocks at predetermined intervals.

14. The semiconductor device according to claim 1, wherein the event controller is further configured to select whether to interrupt the central processing unit based on the selected event processing request or to start a process by the event controller.

15. The semiconductor device according to claim 14, wherein the event controller is configured to:
when interrupting the central processing unit:
generate a vector number corresponding to the selected event processing request, and
output to the central processing unit a CPU interrupt request for the central processing unit and the vector number, and
when starting the process by the event controller:
generate the event ID corresponding to the vector number, and
output the generated event ID to the plurality of the functional blocks.

16. The semiconductor device according to claim 15, wherein the event controller includes:
an event detection block that:
receives the input of the event processing requests,
arbitrates the inputted event processing requests,
selects one of the event processing requests to be processed,
generates the vector number corresponding to the selected event processing request,
selects whether to interrupt the central processing unit based on the selected event processing request or to start the process by the event controller,
outputs the CPU interrupt request and the vector number to the central processing unit when interrupting the central processing unit is selected, and
outputs an event controller start request and the vector number when starting the process by the event controller is selected, and
an event transmission block that:
receives an input of the event controller start request and the vector number outputted from the event detection block,
generates the event ID corresponding to the vector number, and
outputs the generated event ID to the plurality of the functional blocks.

17. The semiconductor device according to claim 16, wherein the event detection block includes:
an event processing permission register that stores event processing permission information that defines whether to interrupt the central processing unit or to start the process by the event controller,
an event determination unit that determines whether to interrupt the central processing unit or to start the process by the event controller for each event processing request based on the event processing permission information, and
an event selection unit that:
arbitrates a plurality of the event processing requests that are determined to interrupt the central processing unit by the event determination unit,
selects one of the event processing requests that are determined to interrupt the central processing unit to be processed,
generates the vector number corresponding to the selected event processing request to interrupt the central processing unit,
outputs the CPU interrupt request and the vector number to the central processing unit,
arbitrates a plurality of the event processing requests that are determined to start the process by the event controller by the event determination unit,
selects one of the event processing requests that are determined to start the process by the event controller to be processed,
generates the vector number corresponding to the selected event processing request to start the process by the event controller, and
outputs the event controller start request and the vector number to the event transmission block.

18. The semiconductor device according to claim 17, wherein the event detection block includes an event selection register that stores priority information that defines priority for each interrupt factor, and
wherein the event selection unit selects the event processing request to be processed based on the priority information.

19. The semiconductor device according to claim 17, further comprising:
an event selection register that stores interrupt mask level information that defines whether or not the central processing unit receives an interrupt,
wherein the event selection unit determines whether or not to interrupt the central processing unit based on the interrupt mask level information.

20. The semiconductor device according to claim 1, comprising:
an internal bus,
wherein the generated event ID is sent from the event controller to one or more of the functional blocks through the internal bus, and
the input of event processing requests is received by the event controller from the functional blocks not through the internal bus.

* * * * *